Patented Mar. 24, 1942

2,277,061

UNITED STATES PATENT OFFICE 2,277,061

LEAD ALUMINATE PIGMENT AND PAINT AND METHOD OF MAKING SAME

Louis E. Barton, Windsor, Conn.

No Drawing. Application March 28, 1939, Serial No. 264,583

20 Claims. (Cl. 23—52)

My invention relates generally to pigments, their preparation and application, and more specifically to a new and improved type of white pigments—the aluminates of lead—together with improved methods of making same and their application in paints.

In my co-pending application for patent Serial No. 41,867, filed in the U. S. Patent Office September 24, 1934, I have described an improved method of making white aluminates of certain metallic elements, which may be summarized as consisting in heating an intimately blended mixture containing an oxide of the metallic element and the oxide of aluminum to a temperature sufficiently high to form the aluminate, but without fusion of the charge.

The white aluminate pigments so prepared are mostly stable to the action of water and other influences, and also have physical properties which make them suitable for use in paints and for other applications where white pigments are required. However I have found that in the case of lead aluminate pigments, the degree of stability to the action of water depends upon the quality of materials used, and it is one of the objects of my invention to provide an improved method of making lead aluminates whereby the product is stabilized so as to impart the desired properties.

In my co-pending application for patent Serial Number 270,013, filed April 25, 1939, the preparation of lead aluminate pigments is particularly described and discussed. My process of making lead aluminate pigments there described, in brief, consists in making a mixture of such lead and aluminum compounds as will, when heated, supply to the product only lead and aluminum oxides and then heating the mixture in the temperature range about 725 to 880° C. until the oxides of lead and aluminum chemically combine by reaction in the solid phase. Such general process may optionally be modified by precalcining the alumina, as there described, before mixing it with the lead compound to yield, after calcining the mixture, a lead aluminate of improved or perfect stability.

I have furthermore discovered that an improved lead aluminate pigment can be made by controlled hydration of the product already stabilized by precalcining the alumina as before described. Such process and product I have fully disclosed and claimed in my co-pending application for patent Serial No. 270,012, filed in the United States Patent Office April 25, 1939.

In my co-pending United States patent application Serial No. 129,817, filed March 9, 1937, of which this application is a continuation-in-part, I have described a process of making hydrated lead aluminate pigments of improved stability that will not discolor when treated with water, which, briefly described, consists in heating an intimate mixture of lead oxide and aluminum oxide to formation of lead aluminate in the solid phase without fusion and then thoroughly washing the calcined product and drying it. It was stated in the application referred to that in addition to the lead aluminate pigments of regular molecular formula, there shown in detail, others of any desired composition could be prepared. It was also stated that lead aluminate pigments can be prepared at temperatures lower than the "safe temperature range" specified. It is the object of this application not only to show the working of my process in preparing stable lead aluminates of regular molecular formula but also to show how the stabilizing process applies to lead aluminates of other compositions and to lead aluminates made at the lower temperatures referred to as well as those made in the stated "safe temperature range."

The instability of lead aluminate pigments results in a hydration of the pigment when subjected to the action of water, the action being accelerated at elevated temperatures. The hydration, if not excessive, is not detrimental and to some extent is advantageous as will be shown later, but when the hydration is excessive it is accompanied by the development of a brown or gray color which becomes progressively darker with longer continued action of water.

With the more unstable lead aluminates the degree of instability may be roughly determined by observing the time required for noticeable color changes. However, the degree of instability is best judged by determining the amount of hydration that results from subjecting the pigment to the action of water for a given time. I have furthermore found that lead aluminate pigments prepared as described in my co-pending patent application Serial No. 41,867 referred to, may, after long storage, acquire a brownish color indicative of the instability of the pigment under atmospheric conditions.

If anhydrous alumina ($Al_2O_3$), having the so-called alpha structure, is used in making the lead aluminate, the product will be perfectly stable; but in that case, if the aluminum oxide has been calcined at too high a temperature, the reaction between the lead and aluminum oxides takes place very slowly, so as to make the process more expensive if not impracticable. Such product is also liable to be of poor color or relatively less white.

If aluminum hydrate, or aluminum oxide, which has been prepared by calcining aluminum hydrate at temperatures below 1000° C. is used in making the lead aluminate, the reaction between the lead and aluminum oxides will proceed rapidly to completion so as to yield a white product, but one which is relatively less stable. Such a product is in fact sufficiently stable to be wet-milled and dried as described in my pending application Serial Number 41,867, but the production of a perfectly stable lead aluminate pigment has distinct advantages over the less stable product.

As a product, stable lead aluminate has the advantage in various applications in the arts, many of which require water or aqueous solutions, or involve the use of water in preparation of the product, that there is no danger of hydration or possible discoloration. In the process of manufacturing lead aluminates the stable products have the distinct advantage in that they may be handled in continuous systems of wet-milling and classification, which may subject the pigment to the action of water for many days. It is permissible also to use higher temperatures in drying the wet-milled product.

In making lead aluminate, as described in my pending application Serial No. 41,867, the upper limit of temperature range is only a little above 850° C.; hence if the so-called gamma aluminum oxide ($Al_2O_3$) is used, or if aluminum hydrate, which is changed by heating to temperatures even below 850° C. to gamma structure of aluminum oxide, is employed, the lead aluminate pigment will be relatively unstable.

In my co-pending application for United States patent Serial No. 117,341 filed December 23, 1936, I have disclosed a process of stabilizing lead aluminate pigment by using in the process an aluminum oxide which has been pre-calcined under controlled conditions, and I have also indicated the stabilizing effect of longer calcining of the aluminate and washing the product as by wet-milling. The washing incident to wet-milling, described in my co-pending patent application referred to, may, or may not, be sufficient, depending, apparently, upon quality of materials used, their treatment in process and amount of impurity to be removed.

I have now discovered that if the washing be sufficiently thorough, a hydrated lead aluminate pigment containing a material content of combined water and having the desired stability can be made either when using aluminum hydrate in the process or alumina which has not been pre-calcined at a sufficiently high temperature to assure stability. Such thoroughly washed pigment is not only stabilized against discoloration in the presence of water but is stabilized against discoloration under normal atmospheric conditions during storage.

It is well known that commercial aluminum hydrates and oxides contain small amounts of alkali and other compounds and that lead compounds may also contain impurities. The stabilizing of the lead aluminate by washing the calcined pigment is believed to be largely attributable to the complete or substantially complete elimination of water-soluble compounds by washing the calcined pigment, though it may be in part attributable to physical changes in the product resulting in a more stable form.

The thoroughly washed pigment is not necessarily absolutely free from alkali since it appears that a part is sometimes in fixed chemical combination insoluble in water; also the practical impossibility of removing every trace of soluble material from a finely divided solid is well recognized. What I mean by thorough washing, however accomplished, is substantially complete elimination of water-soluble compounds, such treatment resulting in a hydrated lead aluminate pigment, containing a material content of combined water and thereafter not subject to excessive hydration and not discolored by the action of water nor when kept under normal atmospheric conditions in storage.

In carrying out my improved process, I prefer to wet-mill the calcined pigment for about one hour, or sufficiently long to break down all aggregates and assure maximum contact between liquids and solids. Instead of simply dewatering the slurry from the wet-mill and drying, as is usual, I prefer either to wash the product by settling and decantation with several successive portions of water or by a continuous washing system. If washed by settling and decantation, usually four such washings are sufficient, after which the solids are separated, as by filtration or other means, and finally dried. If a continuous system of washing is employed, such as a series of Dorr tanks, the amount of water required to wash to the same extent may be larger but such practice permits classification of product if desired.

It is obvious that other equivalent means of washing the calcined pigment may be used as by successive wet-milling operation; or by wet-milling followed by filtration and washing in the filter press; or by wet-milling followed by successive centrifugings. It is also possible to wash finely divided calcined products without wet-milling.

I have also found that separately wet-milling the aluminum and lead compounds before blending them, or thorough washing of the blended mixture before calcining, improves the stability of the pigment to some extent, but I prefer to wash the calcined product as described, such procedure being both more effective in stabilizing the pigment and economical in operation.

The products of my improved process, after being subjected to the action of water, are hydrated to an extent depending upon the time and to some extent upon the nature of materials used. For a given stock of materials the time factor can be determined and the hydration controlled by regulating the time the products are subjected to the action of water to yield products within a preferred range of 0.25 to 2.00% of combined water, or the products may be hydrated to a greater extent if desired.

I have furthermore discovered that lead aluminate pigments, whether or not perfectly stabilized against discoloration by the action of water, if hydrated as indicated are, as compared with anhydrous products, of better hiding power and greatly improved in dispersion properties and wetability with vehicles, such as linseed oil. When mixed and ground, the pigment and vehicle readily combine to form a smooth paste, which, upon further dilution with the vehicle, forms a paint of creamy consistency that works easily under the brush and spreads to an even film in which the dispersion of pigment particles is remarkably uniform.

I have furthermore discovered that a stable anhydrous lead aluminate pigment can be made by re-calcining the hydrated pigment for a few minutes at temperatures preferably about 400° C.

By my improved methods I can make normal and basic lead aluminate, $PbAl_2O_4$ and $Pb_2Al_2O_5$, or lead aluminates of intermediate basicity such as $Pb_3Al_4O_9$. It is evident that I may prepare by my improved methods aluminates of any desired composition or containing an excess of either alumina or the basic element; the various aluminates, basic sub-basic, normal and subnormal, adjusting during the heating process proportionally in the product in accordance with natural laws to the state of most stable equilibrium. In case either the aluminum or lead oxide is in large excess, the product may contain some of the excess oxide in solid solution or in the free state or both. By the expression "essentially pure" in the claims, I refer to lead aluminates consisting preponderatingly of chemically combined lead and aluminum oxides, and containing no oxides other than lead and aluminum except it be traces of impurity contained in the raw materials used and combined water.

Before giving specific examples of my invention and discoveries, I will first give a general description of my improved methods covering certain features which are common in the preparation of all my novel lead aluminate pigments.

As a source of aluminum oxide, I may use alumina ($Al_2O_3$), or any aluminum compound which upon heating yields aluminum oxide, such as aluminum hydrate or aluminum nitrate, but I prefer to use aluminum hydrate for economic reasons.

As a source of lead oxide, I may use the oxide as such, or any compound of lead that will yield the required oxide upon heating. For example, in the preparation of lead aluminate, I may use either litharge (PbO), or red lead ($Pb_3O_4$), or lead peroxide ($PbO_2$), or white lead ($2PbCO_3 \cdot PbH_2O_2$).

I then thoroughly mix the alumina with the lead compound in the required proportions either by dry milling, or, preferably, by wet-milling, thereby reducing particle size and also assuring a very close association of the ingredients. The milling may be done either in a batch or a continuous type of mill; in either case I prefer to use a porcelain or silex lining to avoid contamination of materials.

The slurry from the wet-mill is dewatered as by settling and decantation and/or by filtration. Any suitable equipment may be used, such as Dorr tanks and filter presses.

The wet pulp is then charged directly into the heating furnace, or it may be preliminarily dried and then charged into the furnace. The furnace may be either of the batch type, such as a muffle, hearth furnace or Bruckner furnace, or of the continuous kiln type. In either case a lining of high-grade fire brick is satisfactory to avoid contamination of materials. Whatever the type of furnace used, means should be provided for close control of temperature as the upper limit of temperature range for lead aluminates is but little below the fusion point of lead oxide and lead aluminate. In furnaces where products of combustion contact the charge a neutral or oxidizing flame should be maintained to avoid possible reduction of metallic oxides.

The time required in the calcining zone depends upon the temperature. The higher the temperature within the permissible range, the shorter the time. However, there is tendency to clearer color tones at the lower and medium temperatures within the permissible range. The time required at various temperatures will be indicated later in the examples of operation.

White lead aluminate pigments can be made in the temperature range 725° C. to 870° C. though prolonged heating is required at 725° C. and the higher temperature, 870° C., is so near to the fusion point that very close temperature control is required. A temperature range of 750 to 850° C. is satisfactory but for greatest economy I prefer a temperature range of 800 to 850° C. The progress of the reaction during calcining may be readily judged by withdrawing a small sample from the furnace for observation. The lead aluminates will be colored when the reaction is incomplete, but will be substantially white in either hot or cold condition when the reaction is complete.

Some of the lead aluminates are sufficiently fine, as discharged from the calcining furnace, if care has been used not to exceed the upper limit of the calcining temperature range, as to enable them to be used as pigments for paints, but usually milling is required to break down aggregates and also to reduce the particle size.

Wet-milling methods with or without classification are particularly suitable for this process the products of which are stabilized by washing as I have already described.

The following examples are given as illustrative of the operative procedures I use and of the characteristics of some of the products, but should not be regarded as limiting the broad application of my improved method.

EXAMPLE 1.—*Normal lead aluminate*

A mixture of 121 parts of aluminum hydrate, equivalent to 78 parts of aluminum oxide, and 171 parts of lead oxide, PbO, was prepared by wet-milling the materials together for one hour and then dewatering and drying the mixture.

The mixture was then calcined for 2 hours in the temperature range, 830 to 850° C.

The calcined product had a white color. A small sample treated with cold water acquired a strong gray color after 48 hours' treatment.

The remainder of the calcined product was wet-milled for one hour and then washed four times with cold water by settling and decantation within a period of 10 hours. The thoroughly washed slurry was then dewatered and the pigment dried at 90 to 100° C.

*Chemical composition*

| | |
|---|---|
| Lead oxide | 67.50 |
| Aluminum oxide | 30.88 |
| Combined water (hydration) | 1.62 |

*Physical properties*

| | |
|---|---|
| Specific gravity | 5.83 |
| Color | White |
| Oil absorption—parts of oil per 100 parts pigment | 16 |
| Tinting strength—white lead standard=100 | 106 |

Portions of the finished pigment treated with cold water for periods of 10 and 30 days retained their white color and after treatment showed combined water, hydration, of 2.15 and 6.14% respectively.

EXAMPLE 2.—*Normal lead aluminate*

A mixture of 121 parts of aluminum hydrate, equivalent to 78 parts of aluminum oxide, and 171 parts of lead oxide, PbO, was prepared by wet-milling the materials together for one hour and then dewatering and drying the mixture.

The mixture was then calcined for 2 hours in the temperature range, 830 to 850° C.

The calcined product had a white color. A small sample treated with cold water acquired a strong gray color after 48 hours' treatment.

The remainder of the calcined product was wet-milled for one hour and then washed four times with cold water by settling and decantation within a period of 10 hours. The thoroughly washed slurry was then dewatered and the pigment dried at 90 to 100° C.

*Chemical composition*

| | Per cent |
|---|---|
| Lead oxide | 67.80 |
| Aluminum oxide | 31.12 |
| Combined water (hydration) | 1.08 |

*Physical properties*

| | |
|---|---|
| Specific gravity | 5.90 |
| Color | White |
| Oil absorption—parts oil per 100 parts of pigment | 16 |
| Tinting strength—white lead standard=100 | 110 |

Portions of the finished pigment treated with cold water for periods of 10 and 30 days retained their white color and after treatment showed combined water, hydration, of 2.16 and 6.20% respectively.

EXAMPLE 3.—*Normal lead aluminate*

A mixture of 48.2 parts of aluminum hydrate, equivalent to 31.4 parts of aluminum oxide, and 68.6 parts of lead oxide, PbO, was prepared by wet-milling the materials together for one hour and then dewatering and drying the mixture.

The mixture was then calcined for 2 hours at a temperature of 850° C. to 870° C.

A small portion of the calcined product was treated with cold water:

After 48 hours' treatment the product had a gray color and contained 3.95% of combined water.

After 9 days' treatment the product had a strong gray color and contained 12.86% of combined water.

The main portion of the calcined product was wet-milled for 1½ hours and then washed seven times with water by settling and decantation within a period of 8 hours. The washed pigment was dried at a temperature of 90 to 100° C.

*Chemical composition of finished pigment*

| | Per cent |
|---|---|
| Lead oxide | 67.52 |
| Aluminum oxide | 30.84 |
| Combined water | 1.64 |

Portions of the finished pigment treated with cold water and dried had the following properties:

| | Per cent |
|---|---|
| After 48 hours, no discoloration, combined water (hydration) | 2.61 |
| After 9 days, no discoloration, combined water (hydration) | 3.32 |
| After 20 days, no discoloration, combined water (hydration) | 5.80 |

EXAMPLE 4.—*Normal lead aluminate*

A mixture of 48.2 parts of aluminum hydrate, equivalent to 31.4 parts of aluminum oxide, and 68.6 parts of lead oxide, PbO, was prepared by wet-milling the materials together for one hour and then dewatering and drying the mixture.

The mixture was then calcined for 12 hours at a temperature of 730° C. to 750° C.

A portion of the white calcined product was treated with cold water. After seven days the gray product after drying contained 2.92% combined water.

The main portion of the calcined product was wet-milled for one hour and washed four times by settling and decantation within a period of 10 hours and then dried at 90 to 100° C.

The finished pigment contained 1.40% of combined water, or hydration during wet-milling, washing and drying.

A portion of the finished pigment was treated with cold water. After 20 days' treatment the pigment had not discolored and after drying contained 3.66% of combined water.

EXAMPLE 5.—*Normal lead aluminate*

A mixture of 78 parts of aluminum oxide, which had been pre-calcined at 1050° C., and 171 parts of lead oxide, PbO, was prepared by wet-milling the materials together for one hour and then dewatering and drying the mixture.

The mixture was then calcined for 2 hours in the temperature range 830 to 850° C.

The calcined product had a white color. A small sample treated with cold water acquired a slight gray color after 10 days' treatment. The hydration during the 10 days' treatment was 2.16%.

The remainder of the calcined product was wet-milled for one hour and then washed four times with cold water by settling and decantation within a period of 8 hours. The thoroughly washed slurry was then dewatered and the pigment dried at 90 to 100° C.

*Chemical composition*

| | Per cent |
|---|---|
| Lead oxide | 68.00 |
| Aluminum oxide | 31.17 |
| Combined water (hydration) | .83 |

*Physical properties*

| | |
|---|---|
| Specific gravity | 5.88 |
| Color | White |
| Oil absorption—parts of oil per 100 parts of pigment | 15 |
| Tinting strength—white lead standard=100 | 102 |

Portions of the finished pigment treated with cold water for periods of 10 and 30 days retained their white color and after treatment showed combined water, hydration, of 0.98 and 4.12 respectively.

EXAMPLE 6.—*Basic lead aluminate*

A mixture of 57 parts of aluminum hydrate, equivalent to 37 parts of aluminum oxide, and 163 parts of lead oxide, PbO, was prepared by wet-milling the materials together for one hour and then dewatering and drying the mixture.

The mixture was then calcined for 2 hours in the temperature range 810 to 830° C.

The calcined product had a cream white color. A small sample treated with cold water acquired a strong gray color after treatment for 6 days.

The remainder of the calcined product was wet-milled for one hour and then washed four times with cold water by settling and decantation within a period of 10 hours. The thoroughly washed slurry was then dewatered and the pigment dried at 90 to 100° C.

*Chemical composition*

| | |
|---|---|
| Lead oxide | 80.72 |
| Aluminum oxide | 18.40 |
| Combined water (hydration) | 0.88 |

*Physical properties*

| | |
|---|---|
| Specific gravity | 6.72 |
| Color | Cream white |
| Oil absorption—parts of oil per 100 parts of pigment | 14 |
| Tinting strength—white lead standard=100 | 124 |

Portions of the finished pigment treated with cold water for periods of 10 and 30 days retained their white color and after treatment showed combined water, hydration, of 1.40 and 3.58 respectively.

EXAMPLE 7.—*Subnormal lead aluminate*

A mixture of 58 parts of white lead carbonate, equivalent to 50 parts of lead oxide, and 77 parts of aluminum hydrate, equivalent to 50 parts of aluminum oxide, was prepared by wet-milling the materials together for one hour and then dewatering and drying the mixture.

The mixture was calcined for 26 hours at a temperature of 725° C.

The calcined product was wet-milled for one hour and washed four times by settling and decantation within a period of 8 hours and then dewatered and dried at 90 to 100° C.

*Chemical composition of finished pigment*

| | Per cent |
|---|---|
| Lead oxide | 49.45 |
| Aluminum oxide | 49.45 |
| Combined water | 1.10 |

*Physical properties*

| | |
|---|---|
| Specific gravity | 5.26 |
| Color | White |
| Tinting strength—white lead standard=100 | 60 |

A portion of the finished pigment was treated with cold water for seven days without discoloration. After drying, the treated material contained 3.36% combined water.

EXAMPLE 8.—*Sub-basic lead aluminate*

A mixture of 75 parts of lead oxide, PbO, and 35.5 parts of aluminum hydrate, equivalent to 25 parts of aluminum oxide, was prepared by wet-milling the materials together for one hour and then dewatering and drying the mixture.

The mixture was then calcined for 2 hours at a temperature of 820° C. to 840° C.

A small portion of the calcined product showed a gray discoloration after treatment with cold water for 72 hours. After treatment for 7 days the product, after drying, contained 2.90% of combined water.

The main portion of the calcined product was wet-milled for one hour and washed four times by settling and decantation within a period of 10 hours and then dewatered and dried at 90 to 100 C.

*Chemical composition of finished pigment*

| | Per cent |
|---|---|
| Lead oxide | 74.56 |
| Aluminum oxide | 24.86 |
| Combined water | .58 |

*Physical properties*

| | |
|---|---|
| Specific gravity | 6.90 |
| Color | White |
| Tinting strength—white lead standard=100 | 110 |

A portion of the finished pigment was treated with cold water for seven days without discoloration. After drying, the treated material contained 1.22% combined water.

EXAMPLE 9.—*Stable re-calcined lead aluminate*

A portion of the wet-milled, washed and dried product of Example 1 was recalcined for five minutes at a temperature of 600° C. A portion of the re-calcined pigment was then treated with water for 30 days. There was no change in color of the pigment. The hydration in 30 days was 0.90%.

As shown in the foregoing examples, the hydration is not necessarily proportional to the time treated with water but apparently depends also on the quality and condition of materials and their treatment in process; therefore for any stock of materials and combination of process factors the time treated with water would be varied as determined by trial to give the degree of hydration desired. However the results in the foregoing examples do show:

(1) That the time employed in wet-milling and washing can be regulated to yield a pigment containing combined water (hydration) in amount within the preferred range of 0.25 to 2.00% and that the time available for such milling, washing and drying is ample for industrial operation of the process.

(2) When the calcined lead aluminate is promptly and thoroughly washed, the hydration of the pigment is thereafter at a slower rate thus permitting control of combined water content of the product. This is clearly indicated in Examples 3, 4, 5 and 8. Thus in Example 3, when the calcined product was simply treated with cold water it hydrated to 3.95% combined water in 48 hours and to 12.86% combined water in 9 days. After wet-milling, thorough washing and drying, the pigment contained 1.64% of combined water. Portions of the finished pigment similarly treated with cold water for periods of 48 hours and 9 days contained respectively 2.61% and 3.32% combined water; therefore showing an additional hydration during those periods of 0.97 and 1.68% respectively. Even after 20 days' treatment with cold water the combined water was only 5.80%, showing an additional hydration of only 4.16%.

(3) By thorough washing, the lead aluminate pigment is stabilized against discoloration, showing no change in color regardless of the time of treatment with water or the extent of hydration.

My improved lead pigments are insoluble in, and substantially unaffected by water, and though as a group, they are attacked by concentrated acids, and also to some extent by dilute reagents depending upon variety, they are relatively resistant to chemical action as would be expected from chemical combinations formed at high temperatures. It may therefore be inferred that they are relatively stable and less toxic than white lead carbonate.

Two classes of white pigments are generally recognized: (1) The opaque white pigments, such as white lead, zinc oxide and titanium pigments which impart opacity and whiteness when mixed with oil or other organic vehicle; and (2) the extender pigments such as whiting and china clay which do not impart appreciable opacity when similarly mixed with vehicles.

The opaque pigments of class 1 are further subdivided into two classes: (a) Those which are reactive or capable of combining chemically or physico-chemically with ingredients of the vehicle, such as white lead and zinc oxide; and (b) those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My new lead aluminate pigments belong to the class of opaque reactive pigments though they differ in degree of reactivity. This is quite apparent from the characteristics of paint films to be discussed later, but it is definitely indicated in the case of the lead aluminates by their capacity to accelerate the drying of raw linseed oil when mixed with it and spread as paint in a manner similar to the drying action of white lead. This is shown roughly in a quantitative way by the following test and results.

Mixtures of various lead aluminates and also of white lead carbonate were made with raw linseed oil using the same proportion of pigment to vehicle by volume. The mixtures were spread, as rather thick coatings, on a steel plate as nearly as possible at the same spreading rate. The time for the films to become dry to the touch was recorded in hours as follows:

| | Hours |
|---|---|
| Basic carbonate white lead | 52 |
| Normal lead aluminate | 110 |
| Basic lead aluminate ($Pb_3Al_4O_9$) | 47 |
| Basic lead aluminate ($Pb_2Al_2O_5$) | 36 |
| 50% basic lead aluminate ($Pb_2Al_2O_5$) 50% titanium barium pigment | 48 |

From the foregoing results, it should be noted that the normal lead aluminate, though accelerating the drying of linseed oil more than is the case with an inert pigment, is relatively feebly reactive, while the basic lead aluminates are more reactive than white lead. The result showing the accelerating action of basic lead aluminate when mixed with a titanium pigment is particularly important from a practical application standpoint as well as strongly indicating the reactive properties of lead aluminate.

In the enumerated examples before given, no reference has been made to color, since while all are white in the sense of their capacity to produce a white paint, the undertone depends much upon the calcination conditions as before explained. At lower calcination temperature normal lead aluminate has a clear white with a faint cream undertone. The cream undertone of the basic lead aluminate is slightly stronger than in the normal product.

From the foregoing properties of lead aluminate pigments, they are as a group adapted for application to oil, enamel and lacquer type paints, and also for other purposes where white pigments are used, such as for rubber, linoleum and other floor coverings, printing inks, vitrified enamels, etc.

In the field of paints for exterior use much investigation has been conducted for many years in an effort to combine the best features of the various opaque white pigments, but while much progress has been made, the improvement in one feature has too often been accompanied by a loss of other desirable qualities.

Heretofore white lead carbonate was the only white opaque pigment which, without admixture of other pigments would make a reasonably satisfactory exterior paint with linseed oil vehicle. Zinc oxide desirably hardens the paint film, but when used without admixture of other pigments will check and crack: admixture with white lead is the usual practice. Lithopone pigment because chemically unstable to atmospheric influences fails rapidly and is little used in high grade exterior paints. Titanium pigments are in great demand for their excellent hiding power, but fail rapidly by chalking when used alone in exterior paints.

The manufacturers of paints now recommend admixture of titanium pigments with white lead, zinc oxide or both, thereby improving the paint to a certain extent. However, titanium pigments with white lead and linseed oil vehicle, while durable, rapidly accumulate dirt and mildew. The addition of zinc oxide prevents dirt collection and mildew, but in a short time leads to chalking and consequent fading of tinted paints. Chalking and fading of tinted paints also occurs within a short time when mixtures of titanium pigments and zinc oxide are used with a linseed oil vehicle.

From what I have heretofore stated about lead aluminate pigments, it is evident that hiding power, being in most cases in the order of white lead in that respect, is not of special importance, though the hiding power is sufficient to make paints which will cover or hide the surface with the usual number of coats. The outstanding characteristic of lead aluminate pigments is their capacity to impart durability to paints.

I have discovered that paints made with my lead aluminate pigments ground with raw linseed oil vehicle are exceptionally durable when exposed to light and weather, retain gloss longer, and do not chalk for a longer period than is the case with white lead.

I have also found that exterior paints made with mixtures of lead aluminate and titanium pigments in a raw linseed oil vehicle are remarkably durable when exposed to light and weather—being highly resistant to chalking, fading of tints, checking and cracking; they also retain their gloss very well and are free from dirt collection and mildew so as to retain clean surfaces. For the first time to my knowledge this result has been accomplished with a titanium containing paint in a raw linseed oil vehicle.

The cleanness of surface and freedom from dirt collection and mildew of paints containing lead aluminates, particularly the basic lead aluminate, I attribute to the fact that the paint films dry to a harder surface as compared with similar paint combinations made with white lead which dry to a film which remains slightly tacky to the touch for a long time after application.

I have furthermore discovered that a lead aluminate mixed with zinc oxide in a linseed oil paint prevents the checking and cracking which occurs where zinc oxide only is used as the pigment in exterior paint. I have also found that basic lead aluminate mixed with lithopone in a linseed oil vehicle greatly improves the durability of exterior lithopone containing paint.

For exterior paints made with mixed pigments and raw linseed oil vehicle, I prefer to have the lead aluminate about 50% of the pigment combination, but lesser amounts may be used with good results and improvement roughly proportional to the particular percentage used.

I have also found a marked improvement in paints where lead aluminate is added to a plurality of pigments, either a mixture of opaque pigments, or a mixture containing a colored or tinting pigment, or an extender pigment which is often added to increase the pigment volume concentration or to cheapen the paint.

I have furthermore discovered that lead aluminate pigments give remarkable protection to iron and steel under exposure to light, weather and other influences. This result I attribute to the reactive nature of the pigments, apparently functioning like free oxides of lead, such as red lead which for many years has been used with linseed oil as paint where maximum protection of iron or steel is desired. Thus, for the first time, a white pigment suitable for use with linseed oil as a protective coating for iron and steel is available.

I claim as my invention:

1. The method of making an essentially pure, white, stabilized, hydrated lead aluminate pigment which consists in making a mixture of such lead and aluminum compounds as will, upon heating, supply to the product only lead and aluminum oxides, heating the mixture until the said oxides chemically combine in the solid phase without fusion and then thoroughly washing the product with water to substantially eliminate water-soluble compounds to form said stabilized hydrated lead aluminate pigment.

2. The method of making an essentially pure, white, stabilized, hydrated lead aluminate pigment containing 50 to 81% lead oxide, computed on the basis of the anhydrous product, the balance being aluminum oxide, which consists in heating a mixture of lead oxide and aluminum hydrate in the temperature range 725° C. to 870° C. until the oxides of lead and aluminum chemically combine in the solid phase, thoroughly washing the product with water to substantially eliminate water-soluble compounds to form said stabilized hydrated lead aluminate pigment.

3. The method of making an essentially pure, white, stabilized, hydrated lead aluminate pigment, which consists in making a mixture of such lead and aluminum compounds as will, upon heating, supply to the product only lead and aluminum oxides, heating the mixture in the temperature range 725° C. to 870° C. until the said oxides chemically combine in the solid phase without fusion and then thoroughly washing the product with water to substantially eliminate water-soluble compounds to form said stabilized, hydrated, lead aluminate pigment.

4. The method of making an essentially pure, white, stabilized, hydrated basic lead aluminate pigment which consists in making a mixture of such lead and aluminum compounds as will, upon heating, supply to the product only PbO and $Al_2O_3$ with more than one molecular equivalent of PbO to each molecular equivalent of $Al_2O_3$, heating the mixture in the temperature range 725 to 870° C. until the said oxides chemically combine in the solid phase without fusion and then thoroughly washing the product with water to substantially eliminate water-soluble compounds to form said stabilized hydrated basic lead aluminate.

5. The method of making an essentially pure, white, stabilized, hydrated subnormal lead aluminate pigment which consists in making a mixture of such lead and aluminum compounds as will, upon heating, supply to the product only PbO and $Al_2O_3$ with less than one molecular equivalent of PbO to each molecular equivalent of $Al_2O_3$, heating the mixture in the temperature range 725 to 870° C. until the said oxides chemically combine in the solid phase without fusion and then thoroughly washing the product with water to substantially eliminate water-soluble compounds to form said stabilized hydrated subnormal lead aluminate.

6. An essentially pure, white, hydrated, color-stable lead aluminate pigment having a material content of combined water and characterized by its substantial freedom from water-soluble compounds and permanent absence of discoloration either when treated with water or when exposed to the atmosphere.

7. An essentially pure, white, hydrated, color-stable lead aluminate pigment containing 0.25 to 2.00% of combined water and characterized by its substantial freedom from water-soluble compounds and permanent absence of discoloration either when treated with water or when exposed to the atmosphere.

8. An essentially pure, white, hydrated, color-stable basic lead aluminate pigment having a material content of combined water and characterized by its substantial freedom from water-soluble compounds and permanent absence of discoloration either when treated with water or when exposed to the atmosphere.

9. An essentially pure, white, hydrated, color-stable subnormal lead aluminate pigment having a material content of combined water and characterized by its substantial freedom from water-soluble compounds and permanent absence of discoloration either when treated with water or when exposed to the atmosphere.

10. An essentially pure, white, hydrated, color-stable lead aluminate pigment containing 0.25 to 2.00% of combined water and characterized by its substantial freedom from water-soluble compounds and permanent absence of discoloration either when treated with water or when exposed to the atmosphere, such pigment containing, when computed on the basis of the anhydrous product, 50 to 81% of lead oxide (PbO) and the balance aluminum oxide.

11. The method of making an essentially pure, white hydrated lead aluminate pigment having improved hiding power and dispersibility in vehicles which consists in making a mixture of such lead and aluminum compounds as will, upon heating, supply to the product only lead and aluminum oxides, heating the mixture until the said oxides chemically combine in the solid phase without fusion and then treating the product with water for a time sufficient to form said hydrated lead aluminate pigment but insufficient to discolor the product.

12. The method of making an essentially pure, white, hydrated normal lead aluminate pigment having improved hiding power and dispersibility in vehicles which consists in making a mixture of such lead and aluminum compounds as will, upon heating, supply to the product only lead and aluminum oxides in proportions to form normal lead aluminate (PbAl$_2$O$_4$) heating the mixture in the temperature range 725° C. to 870° C. until the said oxides chemically combine in the solid phase and treating the product with water for a time sufficient to form said hydrated normal lead aluminate pigment but insufficient to discolor the product.

13. The method of making an essentially pure, white, hydrated basic lead aluminate pigment having improved hiding power and dispersibility in vehicles which consists in making a mixture of such lead and aluminum compounds as will, upon heating, supply to the product only PbO and Al$_2$O$_3$ with more than one molecular equivalent of PbO for each molecular equivalent of Al$_2$O$_3$, heating the mixture in the temperature range 725° C. to 870° C. until the said oxides chemically combine in the solid phase and treating the product with water for a time sufficient to form said hydrated basic lead aluminate pigment but insufficient to discolor the product.

14. The method of making an essentially pure, white, hydrated subnormal lead aluminate pigment having improved hiding power and dispersibility in vehicles which consists in making a mixture of such lead and aluminum compounds as will, upon heating, supply to the product only PbO and Al$_2$O$_3$ with less than one molecular equivalent of PbO for each molecular equivalent of Al$_2$O$_3$, heating the mixture in the temperature range 725° C. to 870° C. until the said oxides chemically combine in the solid phase and treating the product with water for a time sufficient to form said hydrated subnormal lead aluminate pigment but insufficient to discolor the product.

15. The method of making an essentially pure, white, hydrated lead aluminate pigment having improved hiding power and dispersibility in vehicles and containing 50 to 81% of lead oxide (PbO), computed on the basis of the anhydrous product, the balance being aluminum oxide, which consists in making a mixture of lead oxide and aluminum hydrate, heating the mixture in the temperature range 725° C. to 870° C. until the said oxides chemically combine in the solid phase and treating the product with water for a time sufficient to form said hydrated lead aluminate pigment but insufficient to discolor the product.

16. The method of making an essentially pure, white, hydrated lead aluminate pigment having improved hiding power and dispersibility in vehicles, which consists in making a mixture of such lead and aluminum compounds as will, upon heating, supply to the product only lead and aluminum oxides, heating the mixture in the temperature range 725° C. to 870° C. until the said oxides chemically combine in the solid phase without fusion and treating the product with water for a time sufficient to form said hydrated lead aluminate pigment but insufficient to discolor the product.

17. A substantially pure, white, opaque lead aluminate pigment made by the process of claim 11, said pigment consisting essentially of chemically combined lead and aluminum oxides and a material content of combined water.

18. A substantially pure, white, opaque lead aluminate pigment made by the process of claim 11, said pigment consisting essentially of chemically combined lead and aluminum oxides and 0.25 to 2.00% of combined water.

19. A substantially pure, white, opaque basic lead aluminate pigment made by the process of claim 11, said pigment consisting essentially of chemically combined lead and aluminum oxides and a material content of combined water.

20. A substantially pure, white, opaque subnormal lead aluminate pigment made by the process of claim 11, said pigment consisting essentially of chemically combined lead and aluminum oxides and a material content of combined water.

LOUIS E. BARTON.